(12) United States Patent
Liljeblad et al.

(10) Patent No.: US 7,876,202 B2
(45) Date of Patent: Jan. 25, 2011

(54) HEIGHT CONTROL DEVICE

(75) Inventors: Benny Liljeblad, Lerum (SE); Tobias Vikström, Lerum (SE)

(73) Assignee: Volvo Lastvagnar AB, Göteborg (SE)

( * ) Notice: Subject to any disclaimer, the term of this patent is extended or adjusted under 35 U.S.C. 154(b) by 81 days.

(21) Appl. No.: 11/917,529

(22) PCT Filed: Jun. 30, 2006

(86) PCT No.: PCT/SE2006/000804

§ 371 (c)(1), (2), (4) Date: Dec. 14, 2007

(87) PCT Pub. No.: WO2007/004953

PCT Pub. Date: Jan. 11, 2007

(65) Prior Publication Data

US 2008/0197985 A1  Aug. 21, 2008

(30) Foreign Application Priority Data

Jul. 1, 2005 (SE) .................................... 0501547

(51) Int. Cl.
*G08B 21/00* (2006.01)

(52) U.S. Cl. .................... 340/431; 362/493; 296/180.2; 296/180.3; 296/155; 296/166; 296/91; 49/50; 52/127.2; 52/204.1

(58) Field of Classification Search ................ 340/431; 362/493; 296/180.2, 180.3, 181, 180.4, 180.1, 296/155, 166, 40, 183, 91, 1; 49/50; 52/127.2, 52/204.1

See application file for complete search history.

(56) References Cited

U.S. PATENT DOCUMENTS

| 4,102,548 | A | * | 7/1978 | Kangas | 296/180.3 |
| 4,353,587 | A | * | 10/1982 | Brenholt | 296/180.3 |
| 4,375,898 | A | * | 3/1983 | Stephens | 296/180.3 |
| 4,379,583 | A | * | 4/1983 | Taylor et al. | 296/180.3 |
| 4,401,338 | A | * | 8/1983 | Caldwell | 296/180.2 |
| 4,607,874 | A | * | 8/1986 | Peairs | 296/180.3 |
| 4,779,915 | A | * | 10/1988 | Straight | 296/180.3 |
| 5,389,912 | A | * | 2/1995 | Arvin | 340/435 |
| 5,782,521 | A | * | 7/1998 | Anderson | 296/181.5 |
| 6,177,868 | B1 | * | 1/2001 | Hollingsworth | 340/540 |
| 7,118,164 | B2 | * | 10/2006 | Frank et al. | 296/180.5 |
| 2005/0281042 | A1 | * | 12/2005 | Kawai | 362/493 |

FOREIGN PATENT DOCUMENTS

| FR | 2745900 A1 | 9/1997 |
| JP | 9020139 A | 1/1997 |

* cited by examiner

*Primary Examiner*—Travis R Hunnings
(74) *Attorney, Agent, or Firm*—WRB-IP LLP

(57) ABSTRACT

A device for controlling the height of a load or load carrier behind the cab of a truck includes a sensor supported on a power operated air deflector on the roof of the cab. The sensor is arranged, during vertical movement of the rear end of the air deflector, to sense the maximum height of the load or the load carrier behind the cab and to send signals representing the maximum height to an indicator inside the cab.

6 Claims, 2 Drawing Sheets

HEIGHT CONTROL DEVICE

BACKGROUND AND SUMMARY

The present invention relates to a device for controlling the height of a load or a load carrier behind the cab of a truck.

Normally, after a tractor has been connected to a trailer or a load carrier on a truck has been replaced with another load carrier, the driver has to leave the cab and visually control the total height of the complete vehicle.

For safety and transport economy reasons it would be advantageous if the driver could get exact information about the total height of the complete vehicle without having to step out of the cab.

It is desirable to obtain a device which can present, on a display on the dashboard of the vehicle cab, information about the height of the load or the load carrier behind the cab provided that the height exceeds the level of the cab roof or the level of a air deflector mounted on the roof. The total height of the cab is known and information about the height of a load or load carrier lower than the cab is less important.

According to an aspect of the present invention a device comprises power operated sensor means supported on the outside of the cab and height adjustable between predetermined upper and lower positions, said sensor means being adapted, during vertical scanning movement, to detect the maximum height of the load or load carrier behind the cab and to send signals representing said maximum height to an indicator inside the cab.

Most long haul trucks and trailers nowadays are provided with air deflectors on the cab roof and such air deflectors are often pivotally mounted and manually adjustable to adapt the height of the rear of the air deflector to the maximum height of the load or load carrier in order to improve fuel economy. Manual adjustment of the air deflector is, however, a complicated procedure requiring that the driver climbs up a ladder on the back of the cab to get access to the air deflector.

In a further development of the device according to the invention for a cab, having on the roof an adjustably mounted air deflector, this deflector is provided with power operated adjusting means and the sensor means are supported on a rear portion of the air deflector. When the power operated means are activated to adapt the height of the rear edge of the air deflector to the maximum height of the load or load carrier this height will be detected by the sensor means.

By providing the air deflector with power equipment for adjusting the height, and mounting the height sensor means on the air deflector, simultaneous adjustment of the air deflector and detection of the maximum height will be obtained.

BRIEF DESCRIPTION OF THE DRAWINGS

The invention will be described in more detail below with reference to the accompanying drawings, wherein.

DETAILED DESCRIPTION

Figure 1:
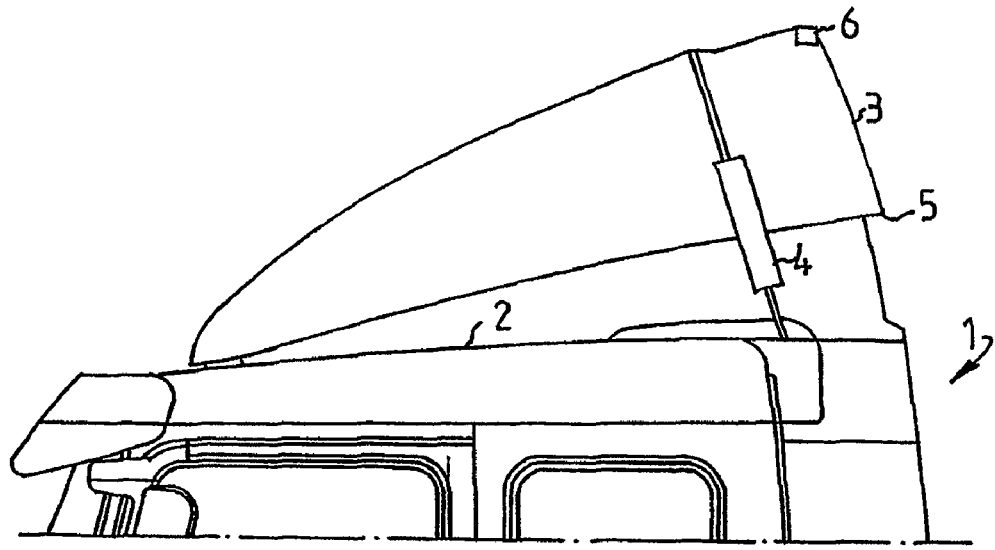
FIG. 1 is a schematic side view of an upper portion of a track or tractor cab.
Figure 2:
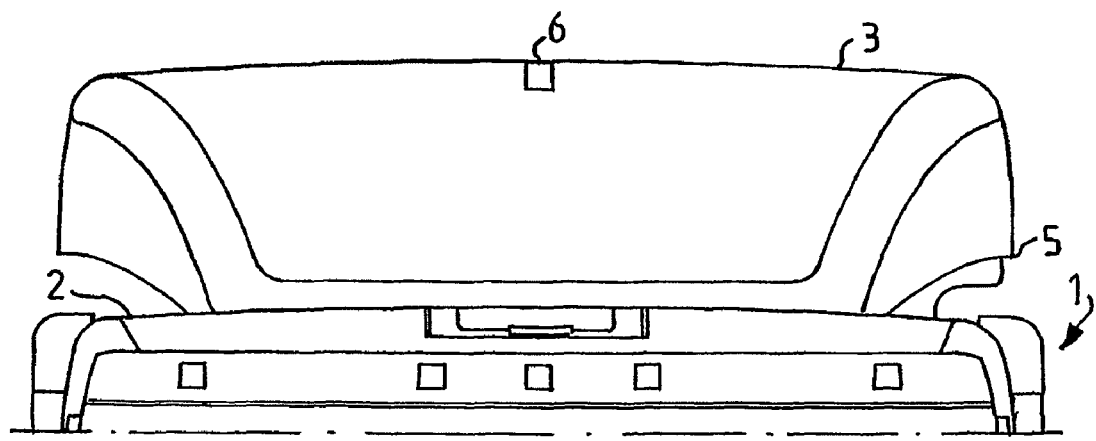
FIG. 2 is a schematic front view of the cab in FIG. 1

In FIGS. 1 and 2 a truck or trailer cab 1 is shown which on its roof 2 supports an air deflector 3. The air deflector is pivotally journalled at its front end portion to the cab roof 2. A pair of power operated jack devices 4 (only one shown) connect the rear portion of the air deflector 3 with the cab roof 2. The jack devices could be driven by electric motors or hydraulic piston-cylinder devices which, when operated, varies the inclination of the air deflector 3 relative to the cab roof 2 to adapt the height of the rear edge 5 of the deflector 3 to the maximum height of a load on a trailer or load carrier (not shown) behind the cab 1.

On the deflector 3 at the mid-section of its rear edge 5 a sensor 6 is mounted. The sensor could be an IR-, ultrasonic or radar sensor which can detect objects in front of it. The sensor 6 is arranged and directed so that it can detect the highest point of an object within a predetermined distance behind the cab which in this case will be the highest point of a load or load carrier behind the cab 2.

Figure 3:
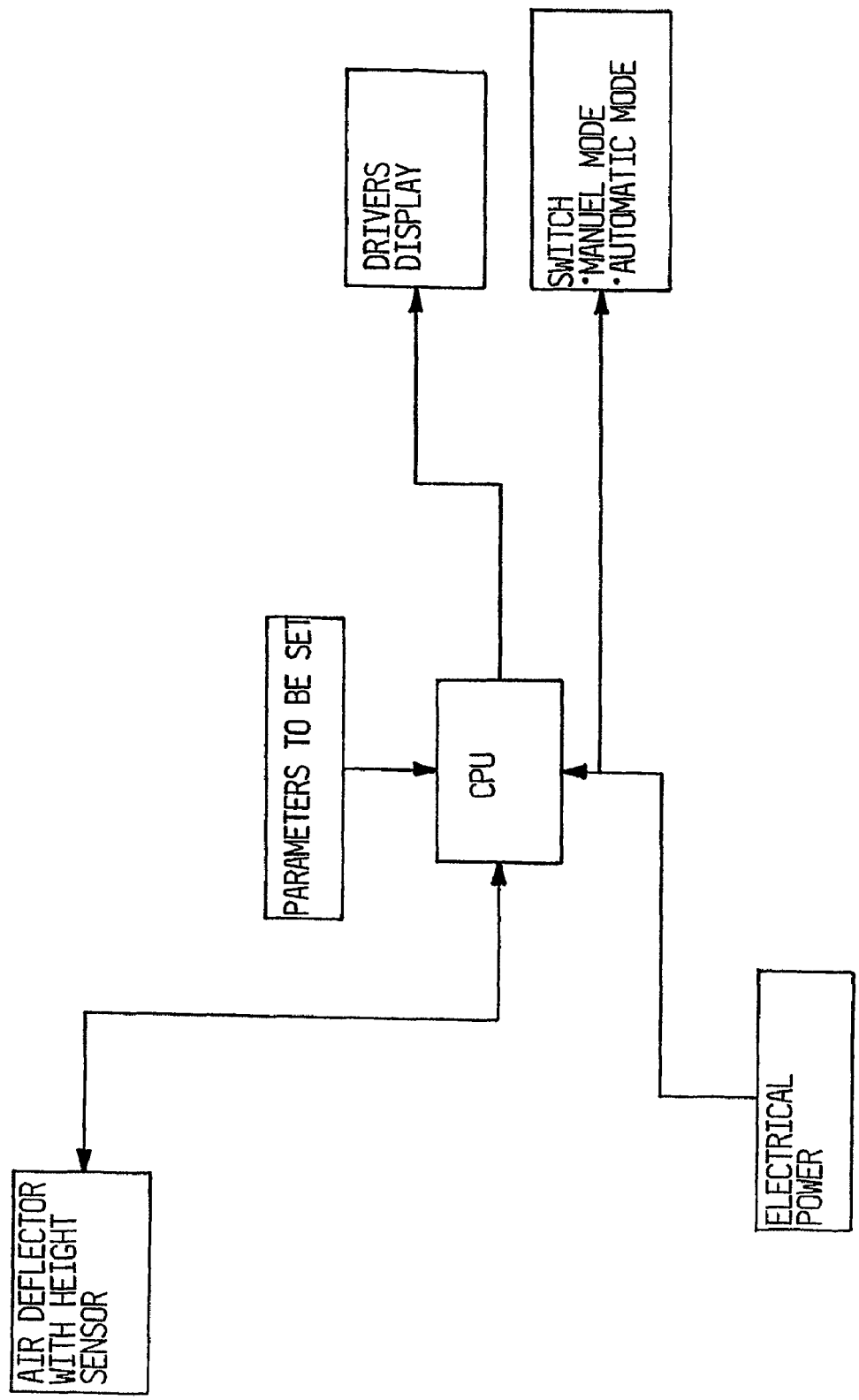
FIG. 3 is a block diagram of a device according to the present invention.

In FIG. 3 a block diagram of the device and control circuit is shown which should be self-explanatory with the exception of "parameters to be set" which among others could be scanning speed and range of the sensor. The range in this case is preferably set to be between upper and lower end positions of the air deflector. As shown, the driver can chose between manual and automatic adjustment of the air deflector 3 to the height of the load or load carrier. When choosing automatic adjustment the air deflector will start scanning from a position where an object is detected within said range and then scan upwards until the object, i.e. the load or load carrier, is no longer detected.

Preferably the device according to the invention also incorporates a wireless remote control so that, when manual adjustment is chosen, the driver can adjust the air deflector at a distance from the vehicle to get a better overview.

When applying the height control device according to the present invention on a vehicle which does not have an air deflector the sensor 6 could be mounted on a telescopic antenna.

In a further development, using a radar antenna and receiver, the height of objects at a predetermined distance in front of the vehicle is also detected. Such objects could, for example, be a tunnel entrance or an underpass.

The invention claimed is:

1. A device for controlling the height of an air deflector relative to a load or load carrier behind the cab of a truck, which device comprises a power operated sensor supported on an outside of the cab, the sensor being arranged to vertically scan the load or load carrier to sense an uppermost point of the load or load carrier behind the cab and to send signals representing the uppermost point to an indicator inside the cab, wherein the sensor is supported on a rear portion of an air deflector which is pivotally supported on the roof of the cab, the air deflector being provided with power operated means arranged to enable movement of a rear edge of the air deflector between an upper end position and a lower end position and adaptation of a height of a rear edge of the air deflector to the uppermost point of the load or load carrier in response to a signal from the sensor, the sensor having a range set to sense the uppermost point of the load or load carrier between the upper and lower end positions of the air deflector.

2. A device according to claim 1, wherein the sensor is operated by electrical power means which communicate with a control unit arranged inside the cab and provided with manual means to switch between automatic and driver controlled scanning of the uppermost point of the load or load carrier.

3. A device according to claim 2, wherein the sensor is arranged, in addition to sensing the uppermost point of the load or the load carrier behind the cab, to sense a height of objects located at a predetermined distance in front of the cab.

4. A device according to claim 1, wherein the sensor is arranged, in addition to sensing the uppermost point of the load or the load carrier behind the cab, to sense a height of objects located at a predetermined distance in front of the cab.

5. A device according to claim 1, wherein the sensor is movable between predetermined upper and lower positions.

6. A device according to claim 1, wherein the predetermined upper and lower positions correspond to uppermost and lowermost positions of the air deflector.

* * * * *